(12) United States Patent
Kim et al.

(10) Patent No.: US 9,382,476 B2
(45) Date of Patent: Jul. 5, 2016

(54) METHOD FOR PREPARING SILICATE PHOSPHOR AND THE SILICATE PHOSPHOR (71) Applicant: KOREA INSTITUTE OF SCIENCE AND TECHNOLOGY, Seoul (KR)

(72) Inventors: Sunjin Kim, Seoul (KR); Kyoungja Woo, Seoul (KR); Sohye Cho, Seoul (KR); Yumi Na, Gyeongsangbuk-do (KR); Jongku Park, Gyeonggi-do (KR)

(73) Assignee: KOREA INSTITUTE OF SCIENCE AND TECHNOLOGY, Seoul (KR)

( * ) Notice: Subject to any disclaimer, the term of this patent is extended or adjusted under 35 U.S.C. 154(b) by 236 days.

(21) Appl. No.: 13/863,672

(22) Filed: Apr. 16, 2013

(65) Prior Publication Data
US 2013/0284975 A1 Oct. 31, 2013

(30) Foreign Application Priority Data

Apr. 25, 2012 (KR) .................. 10-2012-0043410

(51) Int. Cl.
*C09K 11/77* (2006.01)
(52) U.S. Cl.
CPC ......... *C09K 11/7734* (2013.01); *C09K 11/7706* (2013.01); *C09K 11/7774* (2013.01)
(58) Field of Classification Search
CPC ........... C09K 11/7706; C09K 11/7721; C09K 11/7734; C09K 11/7749; C09K 11/7764; C09K 11/7774; C09K 11/7792
USPC .................... 252/301.4 F, 301.4 R
See application file for complete search history.

(56) References Cited

U.S. PATENT DOCUMENTS

| 5,609,792 | A | * | 3/1997 | Cox et al. ................ 252/301.4 F |
| 2012/0004332 | A1 | * | 1/2012 | Yilmaz et al. ................ 521/50 |
| 2012/0107624 | A1 | * | 5/2012 | Klauth .................. C09K 11/02 428/446 |

FOREIGN PATENT DOCUMENTS

| JP | 2003-138257 A | 5/2003 |
| JP | 2004-099383 A | 4/2004 |
| JP | 2007-238879 A | 9/2007 |
| KR | 100834310 B1 | 5/2008 |

OTHER PUBLICATIONS

Ogawa et al., "Controlled spatial separation of Eu ions in layered silicates with different layer thickness", Jan. 19, 2010, ChemComm, vol. 46, pp. 2241-2243.*
Ananias et al., "Optical Detection of Solid-State Chiral Structures with Unpolarized Light and in the Absence of External Fields", 2006, Angew. Chem. Int. Ed., vol. 45, pp. 7938-7942.*
Kim, "Preparation and photoluminescent properties of Eu(III) containing M-layered silicates (M = Li, Na, K, Rb, Cs)", published online, Dec. 22, 2011, Res Chem Intermed, 38, pp. 1191-1202.*
Lee, "Tb3+ and Ce3+ Intercalated Laponite Powder: The Influence of Ce3+ Ions on Thermal Stability and Optical Properties of Tb3+ Intercalated Laponite", 2011, Bull. Korean Chem. Soc., vol. 32, No. 4, pp. 1273-1276.*
Krivovichev et al. (editor), Minerals as Advanced Materials II, book cover and date page only, published Dec. 1, 2011 by Springer Science & Business Media, one page.*
Cadoni et al., "Minerals as Materials—Silicate Sheets Based on Mixed Rings as Modules to Build Heteropolyhedral Microporous Frameworks", from the book Minerals as Advanced Materials II, cited above as item W, pp. 153-162, printed May 8, 2015.*
Felsche, "The Crystal Chemistry of the Rare-Earth Silicates", 1973, Springer Berlin Heidelberg, pp. 99, 103, 109 and 176.*
Han et al., "Ion exchange and fixation of rare-earth cation into expandable tetrasilic fluorine mica", Mar. 2001, J. Synchotron Radiat., 8 (Pt 2) (abstract only), 1 page.*
https://en.wikipedia.org/wiki/Intercalation_(chemistry), (definition of intercalation), printed Feb. 29, 2016, 3 pages.*
https://en.wikipedia.org/wiki/Dopant, (definition of dopant), printed Feb. 29, 2016, 3 pages.*
Thomas L. Barry; "Equilibria and $Eu^{2+}$ Luminescence of Subsolidus Phases Bounded by $Ba_3MgSi_2O_8$, $Sr3MgSi_2O_8$, and $Ca_3MgSi_2O_8$", Journal of the Electrochemical Society, vol. 115, Issue 7, pp. 733-738, 1968 (No exact date found).
Thomas L. Barry; "Fluorescence of $Eu^{2+}$-Activated Phases in Binary Alkaline Earth Orthosilicate Systems", Journal of Electrochemical Society, vol. 115, Issue 11, pp. 1181-1184, 1968 (No exact date found).
Soon-Duk Jee, et al; "Photoluminescence properties of $Eu^{2+}$-activated $Sr_3SiO_5$ phosphors", Journal Material Science, vol. 41, pp. 3139-3141, Published Online: Mar. 10, 2006.

(Continued)

*Primary Examiner* — Jonathan Johnson
*Assistant Examiner* — Lynne Edmondson
(74) *Attorney, Agent, or Firm* — Ladas & Parry LLP (57) ABSTRACT

The present disclosure relates to a method for preparing a silicate phosphor and the silicate phosphor. The method includes (1) a hydrothermal treatment step of obtaining a layered silicate substituted with a rare-earth metal by hydrothermally treating an aqueous solution as a reaction solution, the solution containing rare-earth metal ions, NaOH and silica, and (2) a calcinating step of forming a crystalline silicate by calcinating the layered silicate substituted with the rare-earth metal. According to the method for preparing the silicate phosphor, the silicate phosphors, which can be used as phosphors for LEDs in the aspects of high covalent character, high luminescent intensity and stability at high temperature, may be prepared by a simplified, economic process. Also, the silicate phosphors may selectively emit red, green or blue light by virtue of the substitution of a silicon position with rare-earth metals of various types.

12 Claims, 6 Drawing Sheets

(56) References Cited

OTHER PUBLICATIONS

Makoto Ogawa, et al; "Controlled spatial separation of Eu ions in layered silicates with different layer thickness", ChemComm, vol. 46, pp. 2241-2243, First published as an Advance Article on the web Jan. 19, 2010.

* cited by examiner

METHOD FOR PREPARING SILICATE PHOSPHOR AND THE SILICATE PHOSPHOR

CROSS-REFERENCE TO RELATED APPLICATION

Pursuant to 35 U.S.C. §119(a), this application claims the benefit of earlier filing date and right of priority to Korean Application No. 10-2012-0043410, filed on Apr. 25, 2012, the contents of which is incorporated by reference herein in its entirety.

BACKGROUND OF THE INVENTION

1. Field of the Invention

This specification relates to a method for preparing a silicate phosphor and the silicate phosphor, and particularly, to a method for simply economically preparing silicate phosphors, capable of being utilized as phosphors for LEDs in the aspects of high covalent character, high emission intensity and stability at high temperature, and selectively emitting red, green or blue light by virtue of substitution of a silicon position with various types of rare-earth metals, and the silicate phosphor.

2. Background of the Invention

Studies on the introduction of a transition metal in silicate as a host material to use as catalysts, adsorbents, supporters and the like have been well known. In recent time, as silicate phosphors having a rare-earth metal introduced to the silicate are increasingly used as luminescent materials (phosphors) for LEDs, the silicate is receiving more spotlight as the phosphor.

Examples of the silicate host material include orthosilicate, disilicate, layered silicate and the like. Many attempts have been made to develop silicate phosphors using those host materials.

As reported in documents, orthosilicate phosphors doped with Eu(II) ions may be used as phosphors for fluorescent lamps (J. Electrochem. Soc., 1968, 115, 1181). Strontium orthosilicate ($Eu^{2+}:Sr_3SiO_5$) doped with Eu(II) ions has been reported as an orange phosphor (J. Mater. Sci., 2006, 41, 3139), and disilicate doped with Eu(II) ions ($Eu^{2+}:Ba_3MgSi_2O_8$, $Eu^{2+}:Sr_3MgSi_2O_8$, $Eu^{2+}:Ca_3MgSi_2O_8$) has been reported as a blue phosphor (J. Electrochem. Soc., 1968, 115, 733). However, those Eu(II) ion-doped orthosilicate and disilicate phosphors do not have a hard lattice and a high binding strength. This causes an emission intensity (luminescent intensity) to be lowered as temperature increases.

Another document (Chem. Commun. 2010, 46, 2241) is proposing a red phosphor that Eu(III) ions are introduced to layered silicates having a structure of kanemite ($NaHSi_2O_5.xH_2O$), octosilicate ($Na_8Si_{32}O_{64}.32H_2O$), magadiite ($Na_2Si_{14}O_{29}.10H_2O$) and kenyaite ($Na_2Si_{22}O_{45}.11H_2O$).

Since layered silicates comprise negative charge between layers of a host framework and the negative charge is neutralized by $Na^+$ ion, they are capable of carrying out an ion exchange with other metallic ions. This facilitates the introduction of rare-earth materials.

However, this method theoretically allows for the ion exchange with the rare-earth metal ions only by a quantity of charge of the Na ion existing in the layered silicate. Hence, it has the limit in increasing the quantity of the rare-earth metal introduced by the ion exchange. Further, the ion-exchanged rare-earth metal forms an ionic bond. Accordingly, phosphors prepared by such method exhibit low emission intensities. In addition, the method of preparing the phosphors is uneconomical because of requiring a two-stage process, namely, a hydrothermal process for synthesizing the layered silicates and an ion exchange process for introducing the rare-earth metal.

Therefore, a method of preparing silicate phosphors with high emission intensities by a simplified, economic process is desperately required.

SUMMARY OF THE INVENTION

The present disclosure provides a method of preparing a silicate phosphor, which is capable of exhibiting high covalent character and high emission intensity, by a simplified, economic process. The present disclosure also provides a silicate phosphor capable of being utilized as a phosphor for LED by virtue of stability even at high temperature and selectively using red, green and blue phosphors by virtue of substitution of a silicon position with rate-earth metals of various types.

To achieve these and other advantages and in accordance with the purpose of this specification, as embodied and broadly described herein, there is provided a method for preparing a silicate phosphor, the method including (1) a hydrothermal process of preparing a layered silicate substituted with a rare-earth metal by hydrothermally treating a reaction solution as an aqueous solution containing rare-earth metal ions, NaOH and silica, and (2) forming a crystalline silicate material by calcinating the layered silicate substituted with the rare-earth metal.

A molar ratio of the silica to the rare-earth metal ion within the reaction solution may be 4:0.01 to 0.15. The layered silicate substituted with the rare-earth metal may comprise an ilerite structure, which may be represented by the following chemical formula 1.

$$Na_{2+n}Eu_nSi_{8-n}O_{17}.xH_2O \qquad \text{[Chemical Formula 1]}$$

In the chemical formula 1, n denotes a real number in the range of 0.02 to 0.3, and x denotes an integer in the range of 8 to 12.

A molar ratio of the silica to the rare-earth metal ion within the reaction solution may be 5:0.01 to 0.15. The layered silicate substituted with the rare-earth metal may comprise a magadiite structure, which may be represented by the following chemical formula 2.

$$Na_{2+m}Eu_mSi_{14-m}O_{29}.xH_2O \qquad \text{[Chemical Formula 2]}$$

In the chemical formula 2, m denotes a real number in the range of 0.028 to 0.42, and x denotes an integer in the range of 8 to 12.

A silicate phosphor according to another exemplary embodiment of the present disclosure may include a crystalline silicate material formed by calcinating a layered silicate whose Si position is substituted with a rare-earth metal ion.

The crystalline silicate material may be represented by the following chemical formula 3.

$$Na_{2+n}Eu_nSi_{8-n}O_{17} \qquad \text{[Chemical Formula 3]}$$

In the chemical formula 3, n denotes a real number in the range of 0.02 to 0.3.

The crystalline silicate material may be represented by the following chemical formula 4.

$$Na_{2+m}Eu_mSi_{14-m}O_{29} \qquad \text{[Chemical Formula 4]}$$

In the chemical formula 4, m denotes a real number in the range of 0.028 to 0.42.

An emission material according to another exemplary embodiment of the present disclosure may comprise the silicate phosphor.

A light emitting diode (LED) according to another exemplary embodiment of the present disclosure may comprise the silicate phosphor.

Hereinafter, the present disclosure will be described in more detail.

A method for preparing a silicate phosphor according to the present disclosure may include (1) a hydrothermal treatment step and (2) a calcinating step. The hydrothermal treatment (1) may comprise a process of preparing a layered silicate substituted with a rare-earth metal by hydrothermally treating a reaction solution as an aqueous solution which contains the rare-earth metal ion, NaOH and silica. The calcinating step (2) may comprise a process of forming a crystalline silicate material by calcinating the layered silicate substituted with the rare-earth metal.

Unlike the conventional method of exchanging the rare-earth metal ions after synthesizing the layered silicates, the method for preparing the silicate phosphor may carry out the introduction of the rare-earth metal ion at the hydrothermal synthesis of the layered silicates. This may allow the position of silicon, which is located within the silicate phosphor, to be substituted with the rare-earth metal, thereby preparing the layered silicates having the rare-earth metal by way of a covalent bond other than an ionic bond. The layered silicate has high covalent character so as to exhibit high emission intensity upon being applied as an emitting material. Also, the layered silicate may be stable even at high temperature and prepared by a simplified, economic process so as to be utilized as a superior emitting material.

In order to prepare the layered silicate whose silicon position is substituted with the rare-earth metal, it may be important to adjust a molar ratio of included materials, such as rare-earth metal ions, within a reaction solution according to a type of a layered material desired to be prepared.

For a layered silicate comprising the ilerite ($Na_2Si_8O_{17} \cdot 9H_2O$) structure, the molar ratio ($NaOH:SiO_2:H_2O$) of NaOH, silica ($SiO_2$) and water ($H_2O$) within the reaction solution may be 2:4:40, respectively. A molar ratio ($SiO_2:RE$) of silica to rare-earth metal (RE) ion within the reaction solution may be 4:0.01 to 0.15, preferably, 4:0.03 to 0.11. When the rare-earth metal ion is contained below 0.01 mole based on 4 moles of the silica, the prepared silicate phosphor may have lowered emission intensity. When the rare-earth metal ion exceeds 0.15 mole, a layered structure may not be easily formed, and a concentration quenching may be caused, resulting in degrading emission efficiency.

The layered silicate substituted with the rare-earth metal may comprise the ilerite structure, which may be represented by the following chemical formula 1.

$$Na_{2+n}Eu_nSi_{8-n}O_{17} \cdot xH_2O \qquad \text{[Chemical Formula 1]}$$

In the chemical formula 1, n denotes a real number in the range of 0.02 to 0.3, and x denotes an integer in the range of 8 to 12.

For a layered silicate comprising a magadiite ($Na_2Si_{14}O_{29} \cdot 10H_2O$) structure, a molar ratio ($NaOH:SiO_2:H_2O$) of NaOH, silica ($SiO_2$) and water ($H_2O$) may preferably be 2:5:120, respectively. A molar ratio ($SiO_2:RE$) of the silica to the rare-earth metal (RE) ion within the reaction solution may be 5:0.01 to 0.15, preferably, 5:0.03 to 0.11. When the rare metal ion is contained below 0.15 mole based on 5 moles of the silica, the prepared silicate phosphor may have lowered emission intensity. When the rare-earth metal ion exceeds 0.15 mole, a layered structure may not be easily formed, and a concentration quenching may be caused, resulting in degrading emission efficiency.

The layered silicate substituted with the rare-earth metal may comprise a magadiite structure, which may be represented by the following chemical formula 2.

$$Na_{2+m}Eu_mSi_{14-m}O_{29} \cdot xH_2O \qquad \text{[Chemical Formula 2]}$$

In the chemical formula 2, m denotes a real number in the range of 0.028 to 0.42 and x denotes an integer in the range of 8 to 12.

The rare-earth metal may be one selected from a group consisting of La, Ce, Pr, Nd, Sm, Eu, Gd, Tb, Er, Yb and combination thereof. The selective application of the rare-earth metal may allow red, green or blue light to be selectively emitted.

In the step (1), when the layered silicate desired to be prepared comprises ilerite, NaOH may be dissolved in water to prepare a NaOH aqueous solution. Afterwards, a silica source may be slowly added to the NaOH aqueous solution and stirred for 8 to 24 hours. The product may be mixed with a rare-earth metal aqueous solution and a small quantity of ilerite seed (preferably 0.1 to 0.2 g based on 0.2 mole (12 g) of the silica) and stirred for 2 to 4 hours, thereby preparing a reaction solution. The reaction solution may be sealed within a container such as a Teflon reaction vessel or the like, and hydrothermally treated at temperature in the range of 100 to 120° C. for 3 to 10 days.

When the temperature of the hydrothermal treatment is below 100° C., the reaction may be extremely slowed down. When the temperature is over 120° C., the layered silicate may not be formed or may be formed with impurities of other unexpected structures.

In the step (1), when the layered silicate desired to be prepared comprises magadiite, NaOH may be dissolved in water to prepare a NaOH aqueous solution. Afterwards, a silica source may be slowly added to the NaOH aqueous solution and stirred for 8 to 24 hours. The product may be mixed with a rare-earth metal aqueous solution and stirred for 2 to 4 hours, thereby preparing a reaction solution. The reaction solution may be sealed within a container such as a Teflon reaction vessel using stainless or the like, and hydrothermally treated at temperature in the range of 150 to 170° C. for 1 to 3 days. When the temperature of the hydrothermal treatment is below 150° C. or over 170° C., it may be difficult to form the magadiite structure.

In the step (2), the calcinating temperature may be in the range of 700 to 1200° C., preferably, in the range of 800 to 1000° C. When the calcinating temperature is below 700° C., it may be difficult to form one selected from a group consisting of tridymite, cristobalite, quartz and combination thereof. When the calcinating temperature is over 1200° C., the cohesion of the rare-earth metal may be caused, resulting in degradation of emission efficiency.

In the step (2), the calcinating may be carried out in an atmosphere of a gas selected from a group consisting of air (oxygen), nitrogen, argon, helium and combination thereof. The calcinating time may preferably 1 to 4 hours.

A silicate phosphor according to another exemplary embodiment of the present disclosure may include a crystalline silicate material formed by calcinating a layered silicate whose Si position is substituted with a rare-earth metal ion.

The silicate phosphor may exhibit higher emission intensity by virtue of high covalent character, as compared with a phosphor prepared by calcinating a layered silicate with the rare-earth metal in the conventional ion exchange manner. Also, the superior stability of the silicate phosphor may result in exhibiting an excellent emission effect at high temperature.

The rare-earth metal may be one selected from a group consisting of La, Ce, Pr, Nd, Sm, Eu, Gd, Tb, Er, Yb and combination thereof. The crystalline silicate material calcinated at the high temperature may include one selected from a group consisting of tridymite, crystobalite and quartz.

The silica and the rare-earth metal comprised in the silicate phosphor may be in a molar ratio of 4:0.01 to 0.15. This may allow for formation of a silicate material comprising the ilerite structure, and preparation of the crystalline silicate material by calcinating the silicate material with the ilerite structure. The crystalline silicate material may be represented by the following chemical formula 3.

[Chemical Formula 3]

In the chemical formula 3, n denotes a real number in the range of 0.02 to 0.3.

The silica and the rare-earth metal comprised in the silicate phosphor may be in a molar ratio of 5:0.01 to 0.15. This may allow for formation of a silicate material having a magadiite structure, and preparation of the silicate phosphor comprising the crystalline silicate material by calcinating the silicate material with the magadiite structure. The crystalline silicate material may be represented by the following chemical formula 4.

[Chemical Formula 4]

In the chemical formula 4, m denotes a real number in the range of 0.028 to 0.42.

The silicate phosphor may be prepared by a simplified method, be stable at high temperature and exhibit high emission intensity. Therefore, the silicate phosphor may be applied as an LED phosphor by being disposed in the LED, and also be applied as emitting materials to various products having phosphors.

In accordance with a method for preparing a silicate phosphor and the silicate phosphor of the present disclosure, the silicate phosphor may be utilized as a superior LED phosphor in the aspects of high covalent character between the rare-earth metal and silicate, high emission intensity and stability at high temperature, which may be resulted from substitution of Si position with a rare-earth metal ion and a calcination process. In addition, the substitution of the Si position with rare-earth metals of various types may allow for the silicate phosphor to selectively emit red, green or blue light. Further, such the silicate phosphor may be prepared by a simplified, economic process.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings.

DETAILED DESCRIPTION OF THE INVENTION

Description will now be given in detail of the exemplary embodiments, with reference to the accompanying drawings. For the sake of brief description with reference to the drawings, the same or equivalent components will be provided with the same reference numbers, and description thereof will not be repeated.

Hereinafter, % used herein without a particular expression refers to a weight %.

EXAMPLE 1

(1) 4.12 g of NaOH (97%) was dissolved in 13 g of distilled water within a polyethylene container. 30 g of colloidal silica (Ludox AS 40, 40% $SiO_2$, 0.2 mole) was slowly added to the above solution and stirred for 24 hours. The stirred solution was mixed with a solution, in which 1.28 g of $EuCl_3.6H_2O$ (0.0035 mole of rare-earth metal ions) was dissolved in 5 g of distilled water, and 0.2 g of ilerite seed and stirred for 3 hours, thereby preparing a reaction solution. The reaction solution was poured into a Teflon reaction vessel, sealed in the stainless vessel, and treated hydrothermally by heating in electric oven at 110° C. for 10 days.

Figure 1:
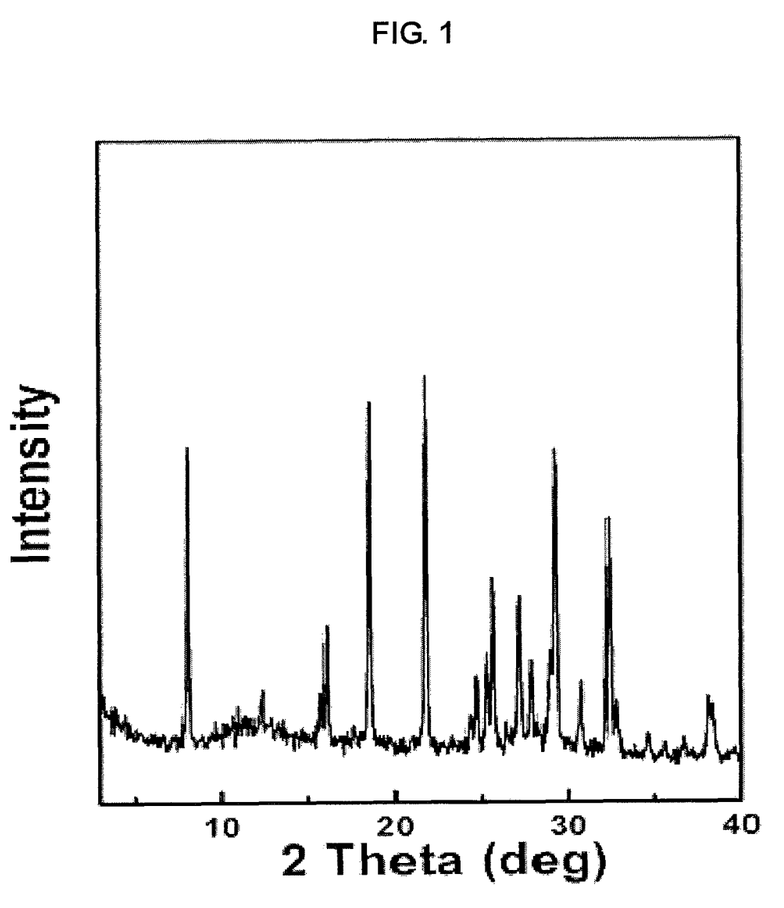
FIG. 1 is an X-ray diffraction pattern of a solid powder (layered silicate substituted with a rare-earth metal) prepared by hydrothermal treatment in Example 1.

A layered silicate substituted with a rare-earth metal, as the solid powder generated by the hydrothermal treatment, was washed several times with distilled water, filtered off, and dried at 100° C. An X-ray diffraction analysis was carried out for the dried solid powder as the layered material substituted with the rare-earth metal, and the analysis result was shown in FIG. 1. As shown in FIG. 1, it was noticed that the layered silicate substituted with the rare-earth metal was well formed with an ilerite structure.

Figure 2:
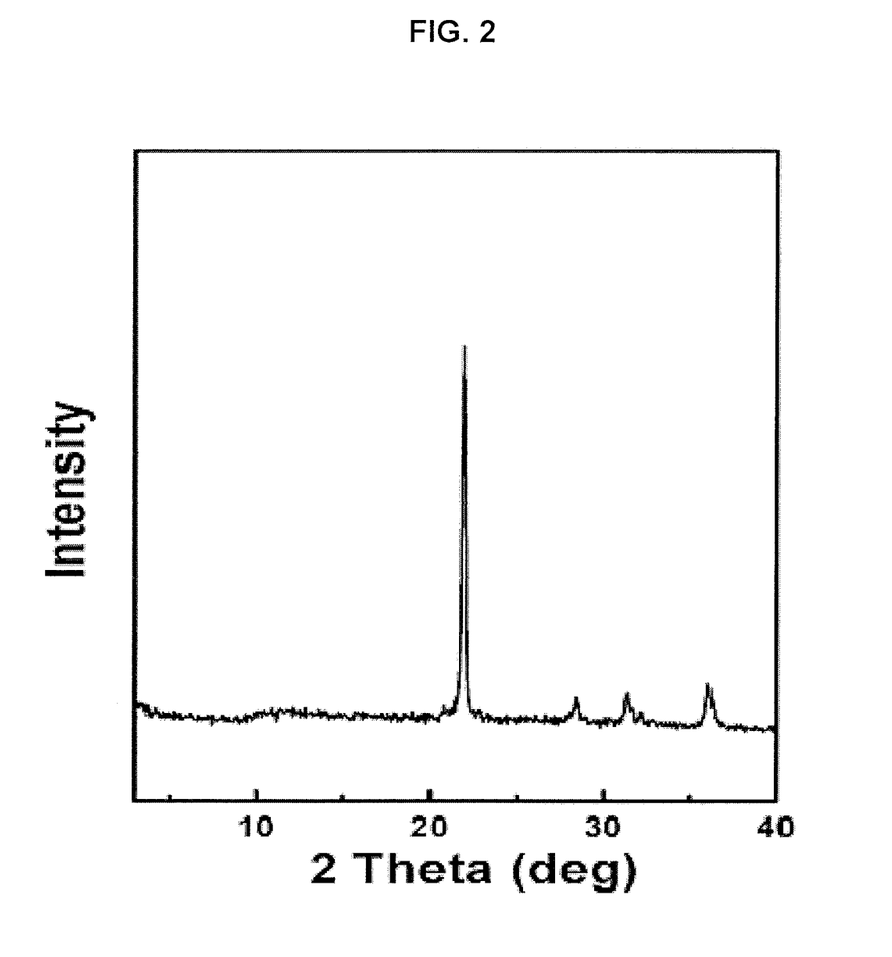
FIG. 2 is an X-ray diffraction pattern obtained by measuring a crystalline layered silicate prepared by calcinating the solid powder, prepared by the hydrothermal treatment in Example 1, at 800° C.

(2) The dried solid powder (the layered silicate substituted with the rare-earth metal) was calcinated at 800° C. in air for 2 hours, to prepare a crystalline silicate material. The crystalline silicate material was analyzed by X-ray diffraction, and the result was shown in FIG. 2. As shown in FIG. 2, it was noticed from the crystalline silicate material that the ilerite structure of the layered silicate substituted with the rare-earth metal was converted into a crystobalite structure due to the calcination.

EXAMPLE 2

(1) A layered silicate substituted with a rare-earth metal, as a solid powder, was prepared by the same method as Example 1 using 4.12 g of NaOH, 30 g of colloidal silica (0.2 mole of silica), 18 g of distilled water and 2.01 g of $EuCl_3.6H_2O$ (0.0055 mole of rare-earth metal ions) and 0.2 g of ilerite seed. The solid powder was analyzed by X-ray diffraction, and it was checked that the ilerite structure was formed.

(2) A crystalline silicate material was formed by calcinating the layered silicate substituted with the rare-earth metal, as the solid powder, at 800° C. in air for 2 hours. The crystalline silicate material was analyzed by X-ray diffraction, and it was noticed that the ilerite structure was converted to the crystobalite structure.

EXAMPLE 3

A crystalline silicate material was prepared by calcinating the layered silicate substituted with the rare-earth metal, as the solid powder prepared in the step (1) of Example 1, at 1000° C. in air for 2 hours. The crystalline silicate material was analyzed by X-ray diffraction, and the conversion to tridymite and cristobalite structures was observed.

EXAMPLE 4

A crystalline silicate material was prepared by calcinating the solid powder prepared in the step (1) of Example 2 at 1000° C. in air for 2 hours. The crystalline silicate material was analyzed by X-ray diffraction, and the conversion to tridymite and crystobalite structures was observed.

EXAMPLE 5

(1) 3.3 g of NaOH (97%, alkali) was dissolved in 58.4 g of distilled water in a polyethylene container. 30 g of colloidal silica (Ludox AS 40, 40% $SiO_2$, 0.2 mole) was slowly added to the above solution and stirred for 24 hours. The product was mixed with a solution in which 1.03 g $EuCl_3.6H_2O$ (0.0028 mole of rare-earth metal ions) was dissolved in 10 g of distilled water and stirred for 3 hours, thereby preparing a reaction solution. The reaction solution was poured in Teflon reaction vessel, which was then sealed by stainless. The solution in the Teflon reaction vessel was hydrothermally treated by heating in electric oven at 160° C. for 2 days.

Figure 3:
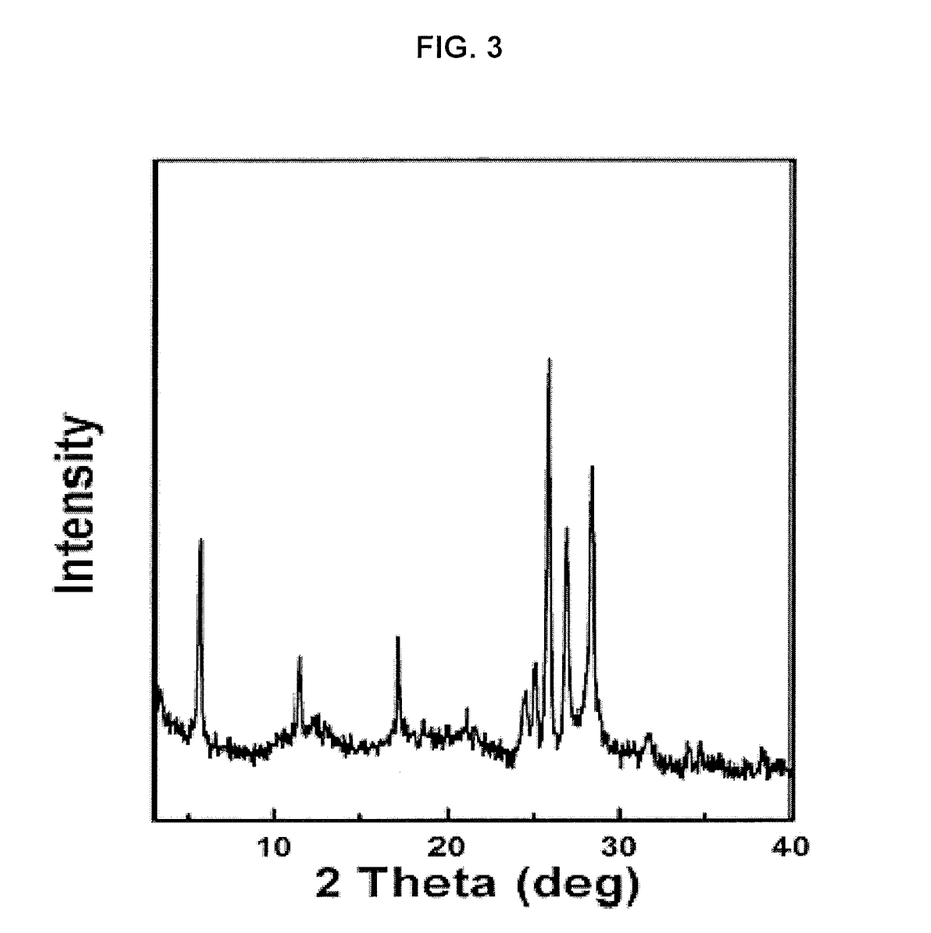
FIG. 3 is an X-ray diffraction pattern of a solid powder (layered silicate substituted with a rare-earth metal) prepared by hydrothermal treatment in Example 5.

A layered silicate substituted with a rare-earth metal, as the solid powder prepared by the hydrothermal treatment, was washed several times with distilled water, filtered off, and dried at 100° C. The dried solid powder (the layered silicate substituted with the rare-earth metal) was analyzed by X-ray diffraction. The analysis result was shown in FIG. 3. As shown in FIG. 3, it was observed that a magadiite structure was formed on the dried solid powder.

Figure 4:
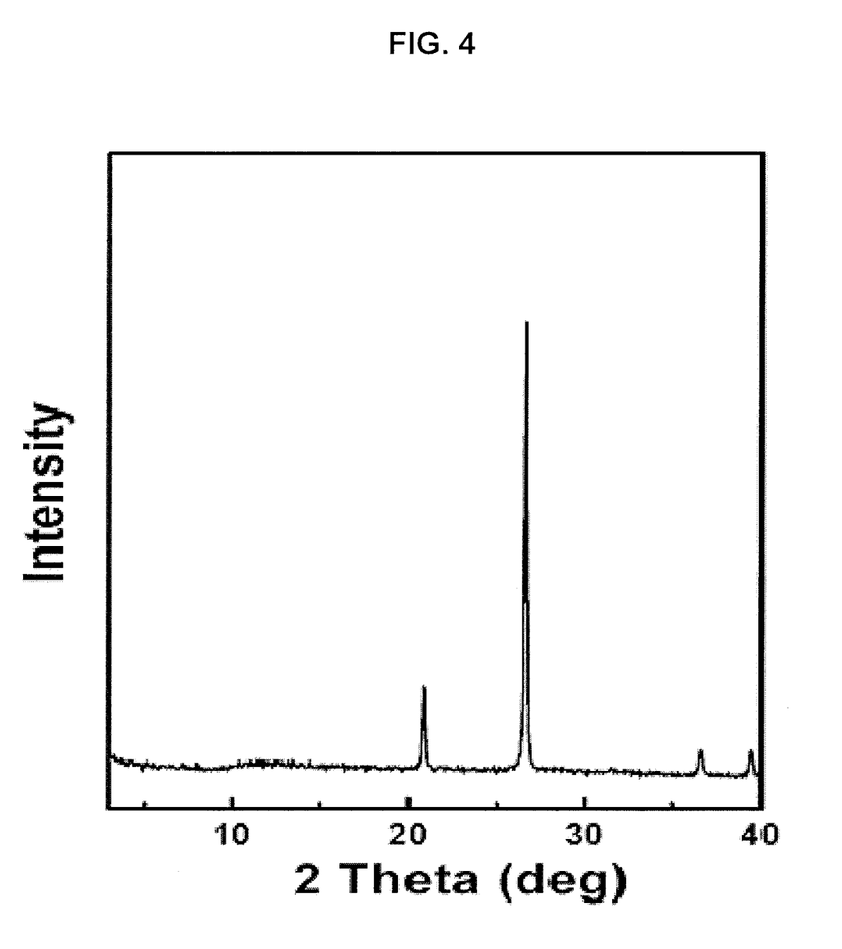
FIG. 4 is an X-ray diffraction pattern obtained by measuring a crystalline layered silicate prepared by calcinating the solid powder, prepared by the hydrothermal treatment in Example 5, at 800° C.

(2) Also, the dried solid powder (the layered silicate substituted with the rare-earth metal) was calcinated at 800° C. in air for 2 hours, to prepare a crystalline silicate material. X-ray diffraction analysis result of the crystalline silicate material was shown in FIG. 4. As shown in FIG. 4, it was observed from the crystalline silicate material that the magadiite structure of the layered silicate substituted with the rare-earth metal was converted to a quartz structure due to the calcination.

EXAMPLE 6

(1) A layered silicate substituted with a rare-earth metal, as a solid powder was prepared through the same method as shown in Example 5, by using 3.3 g, 30 g (0.2 mole of silica), 68.4 g and 1.61 g (0.0044 mole of rare-earth metal ions) of NaOH, colloidal silica, distilled water and $EuCl_3.6H_2O$, respectively. X-ray diffraction analysis results of the solid powder showed the formation of the magadiite structure.

(2) Also, the solid powder (the layered silicate substituted with the rare-earth metal) was calcinated at 800° C. in air for 2 hours, to prepare a crystalline silicate material. X-ray diffraction analysis result of the crystalline silicate material showed that the magadiite was converted to a quartz structure.

EXAMPLE 7

A crystalline silicate material was prepared by calcinating the solid powder (i.e., the layered silicate substituted with the rare-earth metal), prepared in the step (1) of Example 5, at 1000° C. in air for 2 hours. X-ray diffraction analysis result of the crystalline silicate material showed the conversion to a cristobalite structure.

EXAMPLE 8

A crystalline silicate material was prepared by calcinating the solid powder (i.e., the layered silicate substituted with the rare-earth metal), prepared in the step (1) of Example 6, at 1000° C. in air for 2 hours. X-ray diffraction analysis result of the crystalline silicate material showed the conversion to a cristobalite structure.

EXAMPLE 9

(1) A layered silicate substituted with a rare-earth metal, as a solid powder, was prepared by the same method as the step (1) of Example 1, except for the use of 1.31 g of $TbCl_3.6H_2O$ (0.0035 mole of rare-earth metal ions) other than $EuCl_3.6H_2O$ used in Example 1. The solid powder was dried and analyzed by X-ray diffraction, and the analysis result showed that an ilerite structure was formed.

(2) A crystalline silicate was prepared by calcinating the dried solid powder (i.e., the layered silicate substituted with the rare-earth metal) at 1000° C. in air for 2 hours. X-ray diffraction analysis result of the crystalline silicate material showed the conversion to a cristobalite structure.

EXAMPLE 10

(1) A layered silicate substituted with a rare-earth metal, as a solid powder, was prepared by the same method as the step (1) of Example 5, except for the use of 1.05 g of $TbCl_3.6H_2O$ (0.0028 mole of rare-earth metal ions) other than $EuCl_3.6H_2O$ used in Example 5. The solid powder was dried and analyzed by X-ray diffraction, and the analysis result showed that a magadiite structure was formed.

(2) A crystalline silicate material was prepared by calcinating the dried solid powder (i.e., the layered silicate substituted with the rare-earth metal) at 1000° C. in air for 2 hours. X-ray diffraction analysis result of the crystalline silicate material showed the conversion to a cristobalite structure.

Figure 5:
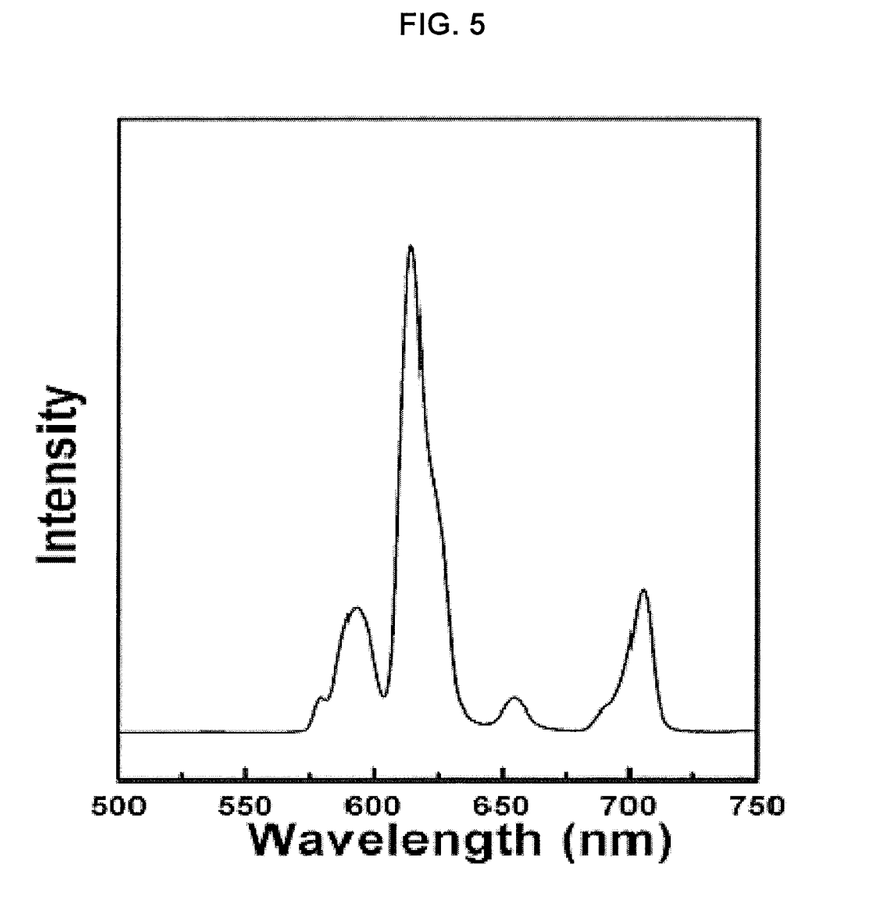
FIG. 5 is an emission spectrum obtained by measuring the crystalline layered silicate prepared in Example 1 using a monochromatic light of 394 nm as an excitation source.

EXPERIMENTAL EXAMPLE (1) An emission spectrum was measured for the crystalline silicate material prepared by Example 1. The emission spectrum was measured at room temperature with Hitachi F700 Florescence Spectrometer (150 W Xenon lamp) by using monochromic light with the wavelength of 394 nm as an excitation source. The measurement was shown in FIG. 5. Referring to FIG. 5, it was confirmed that the silicate phosphor prepared by Example 1 exhibited a superior emission property.

Figure 6:
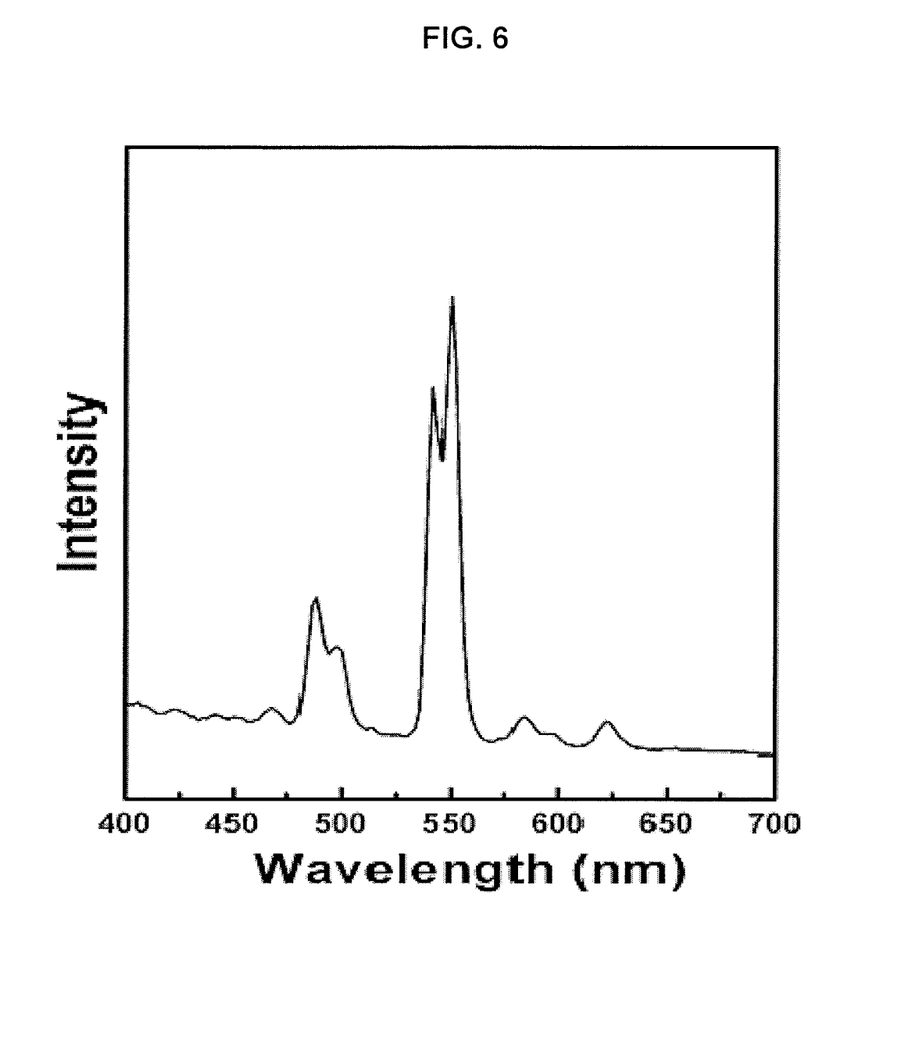
FIG. 6 is an emission spectrum obtained by measuring a crystalline layered silicate substituted with a rare-earth metal, prepared in Example 10, using a monochromatic light of 260 nm as an excitation source.

(2) An emission spectrum was measured by the same way as the step (1) of Experimental Example except for using the crystalline silicate material prepared in Example 10 and using monochromatic light with the wavelength of 260 nm as an excitation source. The measurement was shown in FIG. 6. Referring to FIG. 6, it was confirmed that the silicate phosphor prepared by Example 10 exhibited a superior emission property.

The foregoing embodiments and advantages are merely exemplary and are not to be construed as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A method for preparing a silicate phosphor comprising:
   (1) a hydrothermal treatment step of obtaining a layered silicate substituted with a rare-earth metal by hydrothermally treating an aqueous solution as a reaction solution, the solution comprising rare-earth metal ions, NaOH and silica; and
   (2) a calcinating step of forming a crystalline silicate material by calcinating the layered silicate substituted with the rare-earth metal,
   wherein the rare-earth metal is selected from a group consisting of La, Ce, Pr, Nd, Sm, Eu, Gd, Tb, Er, Yb and a combination thereof.

2. The method of claim 1, wherein a molar ratio of the silica to the rare-earth metal ion within the solution is 4:0.01 to 0.15, and wherein the layered silicate substituted with the rare-earth metal comprises an ilerite structure, and is represented by the following Chemical Formula 1,

[Chemical Formula 1]

$$Na_{2+n}Eu_nSi_{8-n}O_{17} \cdot xH_2O$$

wherein n denotes a real number in the range of 0.02 to 0.3 and x denotes an integer in the range of 8 to 12.

3. The method of claim 1, wherein a molar ratio of the silica to the rare-earth metal ion within the solution is 5:0.01 to 0.15, and wherein the layered silicate substituted with the rare-earth metal comprises a magadiite structure, and is represented by the following Chemical Formula 2,

[Chemical Formula 2]

$$Na_{2+m}Eu_mSi_{14-m}O_{29} \cdot xH_2O$$

wherein m denotes a real number in the range of 0.028 to 0.42 and x denotes an integer in the range of 8 to 12.

4. The method of claim 2, wherein a temperature of the hydrothermal treatment in the step (1) is in the range of 100 to 120° C.

5. The method of claim 2, wherein a time for executing the hydrothermal treatment in the step (1) is in the range of 3 to 10 days.

6. The method of claim 3, wherein a temperature of the hydrothermal treatment in the step (1) is in the range of 150 to 170° C.

7. The method of claim 3, wherein a time for executing the hydrothermal treatment in the step (1) is in the range of 1 to 3 days.

8. The method of claim 1, wherein the calcination in the step (2) is carried out at temperature in the range of 700 to 1200° C.

9. The method of claim 1, wherein the calcinated crystalline silicate material comprises one structure selected from a group consisting of tridymite, cristobalite, quartz and a combination thereof.

10. The method of claim 1, wherein the calcination in the step (2) is carried out in an atmosphere of a gas selected from a group consisting of oxygen, air, nitrogen, argon, helium and a combination thereof.

11. The method of claim 1, wherein the rare-earth metal is selected from the group consisting of La, Ce, Pr, Nd, and Sm.

12. The method of claim 1, wherein the rare-earth metal is selected from the group consisting of Eu, Gd, Tb, Er, and Yb.

* * * * *